Dec. 6, 1949　　　J. J. HESS ET AL　　　2,490,732
DISPENSING PACKAGE
Filed June 27, 1946

INVENTORS.
Joseph J. Hess and
Edward E. Thatcher,
BY
William H. Sellars
ATTORNEY Patented Dec. 6, 1949

2,490,732

UNITED STATES PATENT OFFICE 2,490,732

DISPENSING PACKAGE

Joseph J. Hess and Edward E. Thatcher, Indianapolis, Ind., assignors to E. C. Atkins and Company, Indianapolis, Ind., a corporation of Indiana Application June 27, 1946, Serial No. 679,712

4 Claims. (Cl. 206—16)

This invention relates to containers for band-saw blades so constructed as to serve also as dispensing packages.

It is an object of this invention to provide an improved, durable, and inexpensive package for dispensing band-saw blades which will be free from the objections and disadvantages inherent in prior constructions and which will be so constructed as to facilitate removal of desired lengths of the band saw. It is a further object of the invention to provide containers which readily may be conditioned for selectively packaging band saws of different widths.

Preferably, we embody our invention in a container which has a generally octagonal compartment to receive a coil of band-saw blade, and has flat top and bottom walls to retain the coil in such compartment.

It is an important feature of the invention that our improved container for a coiled band saw presents a compartment in which the top portion of the walls of the compartment is provided with a channel along which the toothed or offset portion of the band saw may freely pass without engaging any portion of the wall of the compartment, thus facilitating dispensing of the band saw and also recoiling of the saw within the box should such be necessary after a dispensing operation.

In order that band saws of different widths may be selectively placed in the compartment, while retaining the advantage of the described channel, means is provided for adjusting the depth of the compartment, this conveniently being accomplished by introducing a filler or supporting member or members in the bottom of the compartment, such filler members being of a thickness to compensate for the reduced width of a narrower band saw so that the toothed portion of the latter may run in the aforesaid channel, thereby obviating any possibility of such toothed portion of the saw engaging any portion of the compartment wall while the band saw is being dispensed from the package or being recoiled therein. Two or more of such fillers or supporting members may be provided and used singly or in combination, thereby making it possible to utilize the package for selectively dispensing a number of band saws of different widths.

In the preferred construction illustrated, a plurality of container-forming members are secured together in superposed relation upon each other and have portions cut therefrom to provide a compartment for the coiled band saw, the topmost member having a compartment-opening larger than that in the next adjacent member whereby a channel is provided for the toothed portion of the band saw. Conveniently, the cut-out portions of said members are utilized as fillers or supporting members in the compartment in preparing the same for use in the selective packaging of band saws of different widths.

In accordance with another feature of the invention, our improved container is strongly constructed of a body of suitable material, such as cardboard. The saw-receiving compartment therein is generally octagonal. Four alternate walls which are generally rectangularly disposed with respect to each other, and which we refer to in the following as "side walls," are positioned to engage the saw coil. Four intermediate walls diagonal with respect to the side walls are positioned farther from the center of the compartment than the side walls, so that they do not engage the coiled portion of the saw. This arrangement limits the wall surfaces engaged by the saw coil to that necessary to minimize undesirable movement of the saw coil within the package.

There is provided, as illustrated, a saw-dispensing opening through a side wall, such opening so positioned that the free end of the blade lies against the corner wall adjacent to that side wall receiving the last contact with the outermost turn of the coiled part of the blade. Thus the outer and free end of the blade, after its last contact with a side wall, extends past a diagonal corner wall before it emerges through the dispensing opening. By reason of the long free end, the saw readily may be grasped and withdrawn from the package.

It is to be understood that the invention and various important features thereof may have other applications and uses, such, for instance, as in the packaging of binding and protecting strips (whether of metallic or of plastic material) characterized by having a lengthwise edge thereof enlarged, curved, bent or offset with respect to the body portion of the strip.

Figure 1:
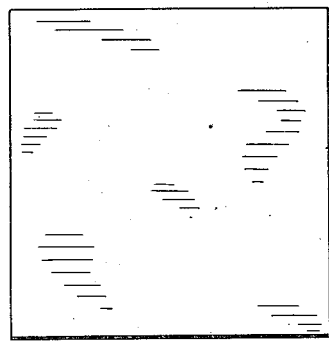
Fig. 1 is a plan view of the bottom piece or element of the package.
Figure 5:
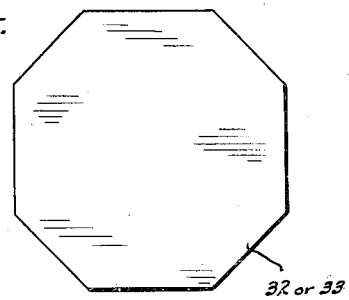
Fig. 5 is a plan view of a filler or supporting member.
Figure 2:
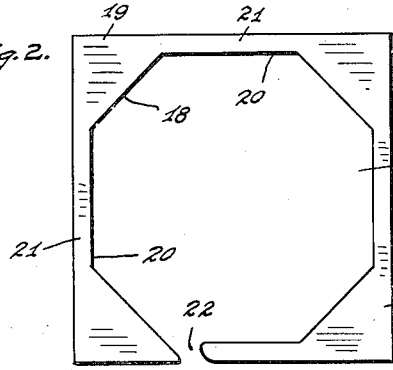
Fig. 2 is a plan view of each of the compartment-forming members below the topmost one.
Figure 3:
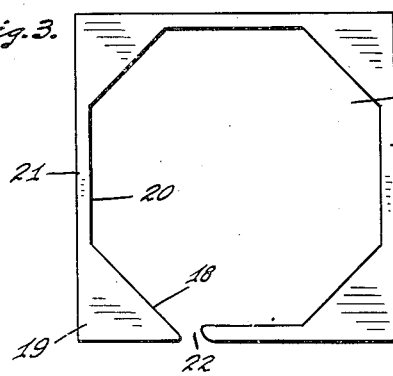
Fig. 3 is a plan view of the topmost compartment-forming member.
Figure 4:
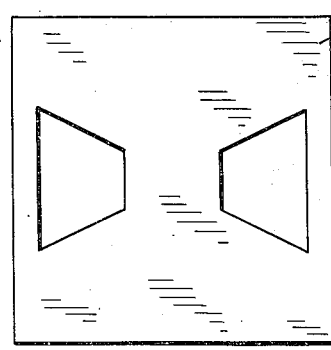
Fig. 4 is a plan view of the top or cover element of the package.

In constructing a container such as that outlined above, there are provided a bottom piece or element 10 (Fig. 1) and a cover member 11 (Fig. 4) between which are assembled compartment-forming members 12, 14 and 16 (Fig. 7) constructed as shown in Figs. 2 and 3, each with an octagonal compartment space therein. Of these members, those designated 12 (Figs. 7 and 8) conveniently each have a thickness of about .065 inch. Upon them are superposed two compartment-forming members 14, each of which may be about .165 inch in thickness. While top compartment-forming member 16 (Figs. 3 and 7) may be of about the same thickness as each of the two members 12, that is, about .065 inch, it differs from the others in having a larger compartment-forming opening therethrough for reasons which will be presently stated. These members 12, 14 and 16 are assembled one upon the other and secured to each other and to bottom piece 10 and to the cover piece 11 (conveniently by glue) to provide a container for a coiled band saw 15, it being understood that in some instances, particularly when relatively heavy saws are to be packaged, tacks, pins or staples may also be used as securing means.

Figure 6:
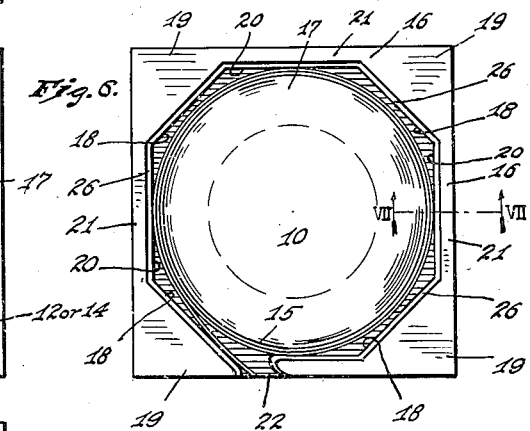
Fig. 6 is a plan view wherein all of the compartment forming members are shown in their assembled relations and the coiled saw blade is represented diagrammatically.

In order that the coiled band saw 15 in compartment 17 (Fig. 6) of the package, both while at rest and while being rotated during removal of selected lengths of the coil, will contact only the vertical faces 20 of the side walls 21, the construction of the compartment-forming members 12, 14 and 16 is such that where a circle drawn inside the polygonal figure presented by the compartment 17 it would contact vertical faces 20 of the side walls 21 of the compartment and would not contact the vertical faces or walls 18 of the diagonal wall portions or blocks 19. By this construction, there is provided sufficient friction between the metallic saw band and the cardboard walls to restrict movements of the coiled band saw such as might lead to retraction of the free end of the saw to an inaccessible point in the container, thus necessitating repositioning of the coiled band saw by manipulation thereof through openings in the cover member 11.

In the illustrated construction, a line extending between and perpendicular to opposed faces or walls 18 of the corner blocks 19 may be longer by about ¼ inch than a line between and perpendicular to the faces 20 of the side walls 21. Hence the band saw in its coiled condition will not touch the diagonal or corner walls 18 but will press firmly against four vertical surfaces 20 on the side walls 21. Only the free end portion of the coiled band saw, which springs outwardly to pass through a dispensing opening 22 (leading from the compartment 17 to the exterior of the package), will contact the vertical wall 18 of the end block 19 adjacent to said opening 22. However, because this is the free end of the coil and because there is no reactive pressure of the coiled saw against said wall, such as would be produced were diagonal walls 18 positioned to engage the main body of the coil, there will be little or no difficulty in seizing the free end of the saw member by the fingers or through the medium of a suitable tool, when it is desired to withdraw a portion of the coiled band saw.

To provide a channel 26 (Figs. 6, 7 and 8) along which the toothed portion of the band saw 15 may freely pass, the uppermost compartment member 16 has a larger compartment opening formed therein, this opening, in the illustrated construction, being about ⅛ inch greater in all of its diameters than the corresponding opening in the subjacent members 12 and 14. Because the thickness of the member 16 is greater than the depth of the toothed portion of the band saw, as indicated at 28 (Figs. 7 and 8), the said toothed portion will pass freely along the channel at 26, formed by a ledge-like face on the member 14 and by the retracted face of the member 16, without digging into any portion of the walls of the compartment. This channel arrangement not only facilitates withdrawal of the saw band from the package during the dispensing operation but, perhaps more importantly, facilitates recoiling of the saw band if, as not infrequently happens, an excess of the saw band is withdrawn. It will be readily understood that it would indeed be difficult to recoil the saw band were the toothed portion thereof digging into the coil-engaged side walls.

Figure 7:
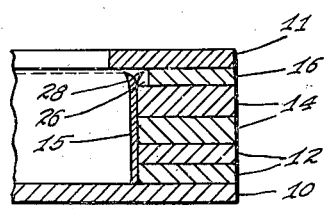
Fig. 7 is a sectional view taken along the line VII—VII of Fig. 6 and including a section of the cover of Fig. 4.
Figure 8:
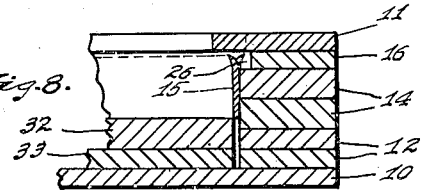
Fig. 8 is a view similar to Fig. 7 with two fillers in the compartment to accommodate a saw of lesser width than that of Fig. 7.

In Fig. 7, the band saw 15 (shown in section) is of such a width (i. e. ½ inch) that, while resting on the bottom piece or element 10, its toothed portion rides freely along the channel 26. If a band saw of lesser width be placed in compartment 17, its toothed portion would not ride in the channel 26 but would engage a portion of the vertical wall 18 just below said channel and would tear portions of the wall away while being drawn along to the exit 22 during dispensing operations. This objectionable situation is eliminated, as indicated in Fig. 8, by placing within the compartment 17 a filler or supporting member or members of such thickness that the toothed portion is raised to and passes freely along the channel 26.

In order to make economical use of the cardboard material utilized in the manufacture of the illustrated container, it is contemplated that the cut-out portions of the compartment-forming members 12, 14 and 16 will be utilized as fillers 32 and 33 (Fig. 8) in the compartment 17. Because the compartment and the supporting fillers are non-circular, the coiled saw band will have support throughout substantially its entire lower edge, except at the points where the side walls tangentially contact the coiled saw band. Accordingly, there is presented no space into which any coil of the band-saw blade may enter to cause the saw blade to jam and become difficultly removable. Hence it is possible to trim the fillers to provide desirable clearance for their easy insertion and removal from the compartment. Upon inspection of Figs. 7 and 8, it will be noted that filler 33 came from member 12, being of the same thickness dimension, while filler 32 came from one of the members 14.

It is to be understood that the specific features of construction relating particularly to the channel provided by the top compartment member 16 and by the filler or supporting members 32 and 33 are illustrative only and that compartment-forming members and filler or supporting members of different thicknesses may be supplied to accommodate band saws of a different range of widths from that mentioned herein and further that, if desired, the top compartment member 16 may be thicker to provide a channel having a greater vertical dimension than that illustrated. Furthermore, the said top compartment member 16 may be cut back to provide a deeper channel, thus providing adequate clearance for a band saw having a broader toothed portion.

Having described our invention what we claim is:

1. In a dispensing package for band saws, a container having a top and a bottom element spaced with respect to each other; a plurality of members superposed upon each other and having portions cut away to provide a polygonal compartment between the top and bottom elements of the container for a coiled band saw, one of said members having a larger compartment opening cut therethrough than that presented in the next adjacent member whereby a channel is provided for a toothed portion of the band saw thus facilitating the removal of the band saw in dispensing operations, and a plurality of fillers or supporting members for use selectively or in association with each other in said compartment, to support any one of two or more band saws of related width dimensions in said compartment in such manner that the toothed portion of the selected band saw will run in the channel provided in the walls of the compartment.

2. In a dispensing package for band saws, a container having a top and a bottom element spaced with respect to each other; a member located between the top and bottom elements and having a compartment formed in octagonal shape for the reception of a coiled band saw, said compartment having walls associated with four diagonal sections and also side walls in alternation with said diagonal sections in a construction and arrangement wherein the diagonal wall sections are spaced farther from the center of the compartment than are the side walls so that the latter take the pressure of the coiled band saw, said compartment having an opening through one of the side walls to permit progressive withdrawal of the band saw, said opening being in alignment with a wall on one of the diagonal sections along which the dispensing end of the band saw may pass without being subjected to any pressure between the coil and a coil-engaging wall.

3. A dispensing package for band-saw blades comprising a top; a bottom; and therebetween a plurality of superposed members having generally octagonal compartment-forming openings therein, the upper member having a larger opening than lower members to provide clearance for the teeth of a coiled saw received in the compartment; four side walls of said compartment positioned to engage the saw coil, the four intermediate and diagonal walls being spaced out of engagement with the saw coil, and one of said coil-engaging walls having a dispensing opening between its junction with a diagonal wall and its coil-engaging area whereby the outer end of a saw coil will diverge from the coil adjacent a coil-engaging wall area and emerge from the package adjacent the coil-engaging wall area next in the direction of coiling.

4. In a dispensing package for coiled articles having an offset or enlarged portion, a container having a top and a bottom element and a member therebetween formed with a substantially continuous series of walls to provide a compartment for a coiled article, said walls being angularly disposed with respect to each other and opposed pairs of said walls alternating with intermediate connecting pairs, said alternating opposed pairs being spaced radially from the center of said compartment by a greater distance than the intermediate connecting pairs whereby said intermediate pairs are contacted by the coiled article and said alternating opposed pairs are not, said intermediate coil-contacted pairs having a cutaway portion which in cooperation with said top element completes the continuity of an unobstructed channel adapted to receive with clearance the offset or enlarged portion of the article.

JOSEPH J. HESS.
EDWARD E. THATCHER.

REFERENCES CITED

The following references are of record in the file of this patent:

UNITED STATES PATENTS

| Number | Name | Date |
|---|---|---|
| 1,484,044 | Toborg | Feb. 19, 1924 |
| 1,496,491 | Ringler | June 3, 1924 |
| 1,908,940 | Weidel | May 16, 1933 |
| 2,310,140 | Wilkie | Feb. 2, 1943 |
| 2,333,099 | Gerking | Nov. 2, 1943 |
| 2,366,886 | Van Tuyl | Jan. 9, 1945 |